United States Patent
Katada

[19]

[11] Patent Number: 5,933,089
[45] Date of Patent: Aug. 3, 1999

[54] PAGER WITH MESSAGE DISPLAY FUNCTION

[75] Inventor: Nobuyuki Katada, Shizuoka, Japan

[73] Assignee: NEC Corporation, Tokyo, Japan

[21] Appl. No.: 08/767,186

[22] Filed: Dec. 16, 1996

[30] Foreign Application Priority Data

Dec. 19, 1995 [JP] Japan .................................. 8-330176

[51] Int. Cl.⁶ .............................. H04Q 7/18; G02F 1/13
[52] U.S. Cl. .................... 340/825.44; 340/311.1; 455/38.4; 370/313; 349/68; 345/102
[58] Field of Search ................. 340/825.44, 311.1, 340/825.69; 455/38.4, 526, 517, 31.1, 140; 370/310, 313; 349/62, 33, 61, 65, 68; 345/102, 87

[56] References Cited

U.S. PATENT DOCUMENTS

| | | | |
|---|---|---|---|
| 4,713,659 | 12/1987 | Oyagi et al. | 340/825.44 |
| 4,755,816 | 7/1988 | DeLuca | 340/825.44 |
| 4,868,563 | 9/1989 | Stair et all. | 340/825.44 |
| 5,153,756 | 10/1992 | Ike | 345/87 X |
| 5,157,525 | 10/1992 | Eaton et al. | 345/87 |
| 5,398,022 | 3/1995 | Lipp | 340/825.44 |
| 5,493,280 | 2/1996 | Shibayama | 340/825.44 |
| 5,548,271 | 8/1996 | Tsuchiyama et al. | 340/825.44 X |
| 5,818,553 | 10/1998 | Koenck et al. | 349/61 |

FOREIGN PATENT DOCUMENTS

| | | |
|---|---|---|
| 0 224 869 A1 | 6/1987 | European Pat. Off. . |
| 3-7433 | 1/1991 | Japan . |
| 3-29328 | 2/1991 | Japan . |
| 3-268628 | 11/1991 | Japan . |
| 4-306023 | 10/1992 | Japan . |
| 5-122129 | 5/1993 | Japan . |
| 5-167506 | 7/1993 | Japan . |
| 6-237206 | 8/1994 | Japan . |
| 6296153 | 10/1994 | Japan . |
| 2 199 435 | 7/1988 | United Kingdom . |
| 2 237 400 | 5/1991 | United Kingdom . |

*Primary Examiner*—Brian Zimmerman
*Assistant Examiner*—William H. Wilson, Jr.
*Attorney, Agent, or Firm*—Scully, Scott Murphy & Presser

[57] ABSTRACT

A pager having a notifier to notify the receipt of a call signal for itself, an LCD to display certain display messages, a light sensor to detect the light quantity of the light irradiated to the surface of the LCD, a control section to generate the contrast adjustment signal corresponding to the received light quantity of the LCD detected by the light sensor, a reference voltage generation section to generate the reference voltage according to the contrast adjustment signal generated by the control section, and an LCD driver to adjust the light intensity of the display message on the LCD according to the reference voltage supplied from the reference voltage generation section.

7 Claims, 8 Drawing Sheets

64 REFLECTIVE SHEET

FIG.9

64 REFLECTIVE SHEET
22 PHOTO SENSOR
21 PHOTO SENSOR

PAGER WITH MESSAGE DISPLAY FUNCTION

BACKGROUNDS OF THE INVENTION

1. Field of the Invention

The present invention relates to a pager provided with display function to display certain messages, and particularly relates to a pager provided with a function to enable or disable display of messages and to change the display contrast according to the ambient environment.

2. Description of the Related Art

In general, a pager with display function to display certain messages is provided with a liquid crystal display (LCD) for a smaller size and a lighter weight. However, the visibility of the LCD display screen largely varies depending on the ambient brightness and it is difficult to read the displayed message in a dark place. Therefore, there have been many proposals about display of messages in a dark place.

According to some examples of such proposals, the pager may be automatically switched between the display mode and the no-display mode for the display screen according to the ambient brightness, or the display on the display unit may be turned on and off by switch operation. Conventional inventions of this type include Japanese Patent Application Laid-open (kokai) No. Heisei 6-237206 "RADIO PAGER AND ITS CONTROL METHOD", Japanese Patent Application Laid-open (kokai) No. Heisei 5-167506 "PAGER", Japanese Patent Application Laid-open (kokai) No. Heisei 4-306023 "PAGER", and Japanese Patent Application Laid-open (kokai) No. Heisei 3-7433 "RADIO PAGER".

Japanese Patent Application Laid-open No. Heisei 6-237260 "RADIO PAGER AND ITS CONTROL METHOD" discloses a pager provided with a photo sensor to detect the brightness of the message display environment. When a pager call is stopped in a dark environment, this pager stores the received message as an unread message so that the user can read that message in a bright place later. Besides, when the pager detects that the ambient environment around the pager changes from a dark condition to a bright condition, it notifies the user of any unread message stored as described above.

Japanese Patent Application Laid-open No. Heisei 5-167506 "PAGER" discloses a pager provided with a light receiver to detect the brightness around the pager and a control circuit to turn off the message display upon detection of a dark condition by the light receiver when the pager is in the wait or new receipt status. While this pager is displaying that it is in the wait or new receipt status, it turns off the display when it is in a dark place and turns on the display only when it is in a bright place.

According to Japanese Patent Application Laid-open No. Heisei 4-306023 "PAGER", a pager comprises an illumination means to illuminate the display means and a display control means. This display control means causes the display means to display the time data upon switch operation while the pager is waiting for a call and then reads the received message data so that it is displayed on the display means. When it is dark around the pager, this pager has the above illumination means illuminate the above display means during display of the time data and the received message data.

Japanese Patent Application Laid-open No. Heisei 3-7433 "RADIO PAGER" discloses a pager comprising a light detection means to detect the ambient light intensity, a control means to disable displaying on the display means when the light quantity detected by the light detection means is below a certain standard and a light source control means to control the intensity of the light source to illuminate the display means.

Among other conventional inventions, there have been proposals to illuminate the LCD with a back light when it is dark around the pager. Conventional inventions of this type include Japanese Patent Application Laid-open No. Heisei 5-122129 "RADIO PAGER", Japanese Patent Application Laid-open No. Heisei 4-306023 "PAGER", Japanese Patent Application Laid-open No. Heisei 3-268628 "RADIO PAGER WITH DISPLAY FUNCTION", and Japanese Patent Publication No. Heisei 3-29328 "RADIO PAGER WITH DISPLAY".

According to Japanese Patent Application Laid-open No. Heisei 5-122129 "RADIO PAGER", a pager sends the operation signal from the decoder to the driving circuit when informing the receipt of a message to cause the double duty lighting means to emit the light. When displaying a message in a dark place, this pager sends the operation signal from the photo sensor circuit to the driving circuit to turn on the double duty lighting means for illumination of the display unit and controls the light intensity of the double duty lighting means by switching the frequency of the operation signal between the receipt information mode and the display unit illumination mode.

Japanese Patent Application Laid-open No. Heisei 4-306023 "PAGER" discloses a pager comprising an illumination means to illuminate the display means and a display control means. Upon switch operation while the pager is waiting for a call, the above display control means causes the display means to display the time data on the display means, reads the received message data so that it is displayed on the display means, and has the above illumination means illuminate the above display means during display of the time and received message data.

Japanese Patent Application Laid-open No. Heisei 3-268628 "RADIO PAGER WITH DISPLAY FUNCTION" discloses a pager which illuminates the display means with the illumination means when the display means is in the received data display status and the light quantity around the display means is below a certain level and also illuminates the display means with the illumination means when the display means is in the general data display status and the light quantity around the display means is below a certain level and an illumination instruction given by switch operation is detected.

Japanese Patent Publication No. Heisei 3-29328 "RADIO PAGER WITH DISPLAY" discloses a pager comprising a data processing means, a display unit, a light detection means to detect that the light quantity around the display unit is below a predetermined level and outputs the detection signal to the data processing means and a display unit illumination circuit having an illumination lamp to illuminate the display unit according to the control signal from the data processing means. The above data processing means comprises a means to generate the control signal when it detects that the output from the detection means is below a predetermined level while the pager is in the display reading status; the above detection means comprises a means to detect that the light quantity is not less than the second predetermined level, which is higher than the above predetermined level, and to send the detection signal to the data processing means so that the above illumination lamp is turned off by such detection signal.

The conventional pagers above have, however, the same light intensity for the LCD. Therefore, the message on the LCD is not displayed in a sharp contrast with the light received by the LCD in some optical environment. This may make it difficult to read the displayed message or may provide excessive light intensity to the LCD, resulting in meaningless quick consumption of the battery.

SUMMARY OF THE INVENTION

It is a first object of the present invention to provide a pager which can detect the received light quantity at the LCD, adjust the light intensity of the LCD according to the detected received light quantity at the LCD so as to set the pager for the optimum contrast of the displayed message corresponding to the received light quantity at the LCD.

It is a second object of the present invention to provide a pager which can be set so as to always display the message in the optimum contrast no matter whether the back light is turned on or off.

It is a third object of the present invention to provide a pager which, when it is dark around the pager and it is difficult to recognize the message displayed on the LCD without back lighting, can switch the LCD to the no-display mode so as to prevent meaningless waste of the battery caused by excessive light intensity of the LCD.

According to one aspect of the invention, a pager having a notifier means for notifying the receipt of a call signal for itself and a display means for displaying messages which displays on said display means a received message received together with said call signal, comprises:

a light detection means for detecting the light quantity of the light irradiated to the surface of said display means;

a control means for generating the contrast adjustment signal corresponding to the received light quantity at the above display means detected by said light detection means;

a reference voltage generation means for generating the reference voltage according to the contrast adjustment signal generated by said control means; and a contrast adjustment means for adjusting the light intensity of the display message on said display means according to the reference voltage supplied from said reference voltage generation means.

In the preferred construction, the light detection means detects the received light quantity at said display means as analog light quantity data, the contrast adjustment signal generated by said control means can be continuous values corresponding to the light quantity data detected by said light detection means, the reference voltage generation means continuously changes said reference voltage according to said contrast adjustment signal, and the contrast adjustment means continuously adjusts the light intensity of the display message according to changes in said reference voltage.

In the preferred construction, the control means generates said contrast adjustment signal when the received light quantity at said display means is found to be equal to or more than the predetermined threshold as a result of detection by said light detection means and generates said contrast adjustment signal to provide instruction to stop the output of said reference voltage to said reference voltage generation means when the received light quantity at said display means is found to be below the predetermined threshold.

In another preferred construction, the light detection means detects the received light quantity at said display means as analog light quantity data, the control means generates said contrast adjustment signal when the received light quantity at said display means is found to be equal to or more than the predetermined threshold as a result of detection by said light detection means and generates said contrast adjustment signal to provide instruction to stop the output of said reference voltage to said reference voltage generation means when the received light quantity at said display means is found to be below the predetermined threshold, and said contrast adjustment signals generated by said control means can be continuous values corresponding to the light quantity data detected by said light detection means, the reference voltage generation means continuously changes said reference voltage according to said contrast adjustment signal, and the contrast adjustment means continuously adjusts the light intensity of the display message according to changes in said reference voltage.

According to another aspect of the invention, a pager having a notifier means to notify the receipt of a call signal for itself, a display means for displaying messages, and an illumination means for illuminating said display means which displays on said display means the received message received together with said call signal, comprises:

a first light detection means for detecting the light quantity of the light irradiated to the surface of said display means;

a second light detection means for detecting the received light quantity at said display means when said illumination means illuminates said display means;

a control means for generating the contrast adjustment signal corresponding to the received light quantity at said display means detected by said first or second light detection means;

a reference voltage generation means for generating the reference voltage corresponding to the contrast adjustment signal generated by said control means; and a contrast adjustment means for adjusting the light intensity of the display message on said display means according to the reference voltage supplied from said reference voltage generation means.

In the above-mentioned construction, the first and second light detection means detect the received light quantity at said display means as analog light quantity data, the contrast adjustment signal generated by said control means can be continuous values corresponding to the light quantity data detected by said first or second light detection means, the reference voltage generation means continuously changes said reference voltage according to said contrast adjustment signal, and the contrast adjustment means continuously adjusts the light intensity of the display message according to changes in said reference voltage.

In the preferred construction, the control means generates said contrast adjustment signal when either of the received light quantities at said display means is found to be equal to or more than the predetermined threshold as a result of detection by said first and second light detection means and generates said contrast adjustment signal to provide instruction to stop the output of said reference voltage to said reference voltage generation means when the received light quantity at said display means is found to be below the predetermined threshold as a result of detection by both of said first and second light detection means.

In the preferred construction, the light detection means detects the received light quantity at said display means as analog light quantity data, the control means generates said contrast adjustment signal when either of the received light quantities at said display means is found to be equal to or more than the predetermined threshold as a result of detection by said first and second light detection means and generates said contrast adjustment signal to provide instruction to stop the output of said reference voltage to said reference voltage generation means when the received light quantity at said display means is found to be below the predetermined threshold as a result of detection by both of said first and second light detection means and said contrast adjustment signal generated by said control means can be continuous values corresponding to the light quantity data detected by said light detection means, the reference voltage generation means continuously changes said reference voltage according to said contrast adjustment signal, and the contrast adjustment means continuously adjusts the light intensity of the display message according to changes in said reference voltage.

In another preferred construction, the control means generates said contrast adjustment signal corresponding to the detection result of said first light detection means when said display means is not illuminated by said illumination means and generates said contrast adjustment signal corresponding to the detection result of said first light detection means when said display means is illuminated by said illumination means, generates said contrast adjustment signal to provide instruction to stop the output of said reference voltage to said reference voltage generation means when the received light quantity at said display means is found to be below the predetermined threshold as a result of detection by said first light detection means while said display means is not illuminated by said illumination means, and displays said display message on said display means and provides illumination instruction to said illumination means if, when it receives the instruction to display said display message on said display means, said display means is not illuminated by said illumination means and the received light quantity of said display means is found to be below the predetermined threshold as a result of detection by said first light detection means.

Other objects, characteristics and effects of the present invention will be clarified in the detailed description below.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
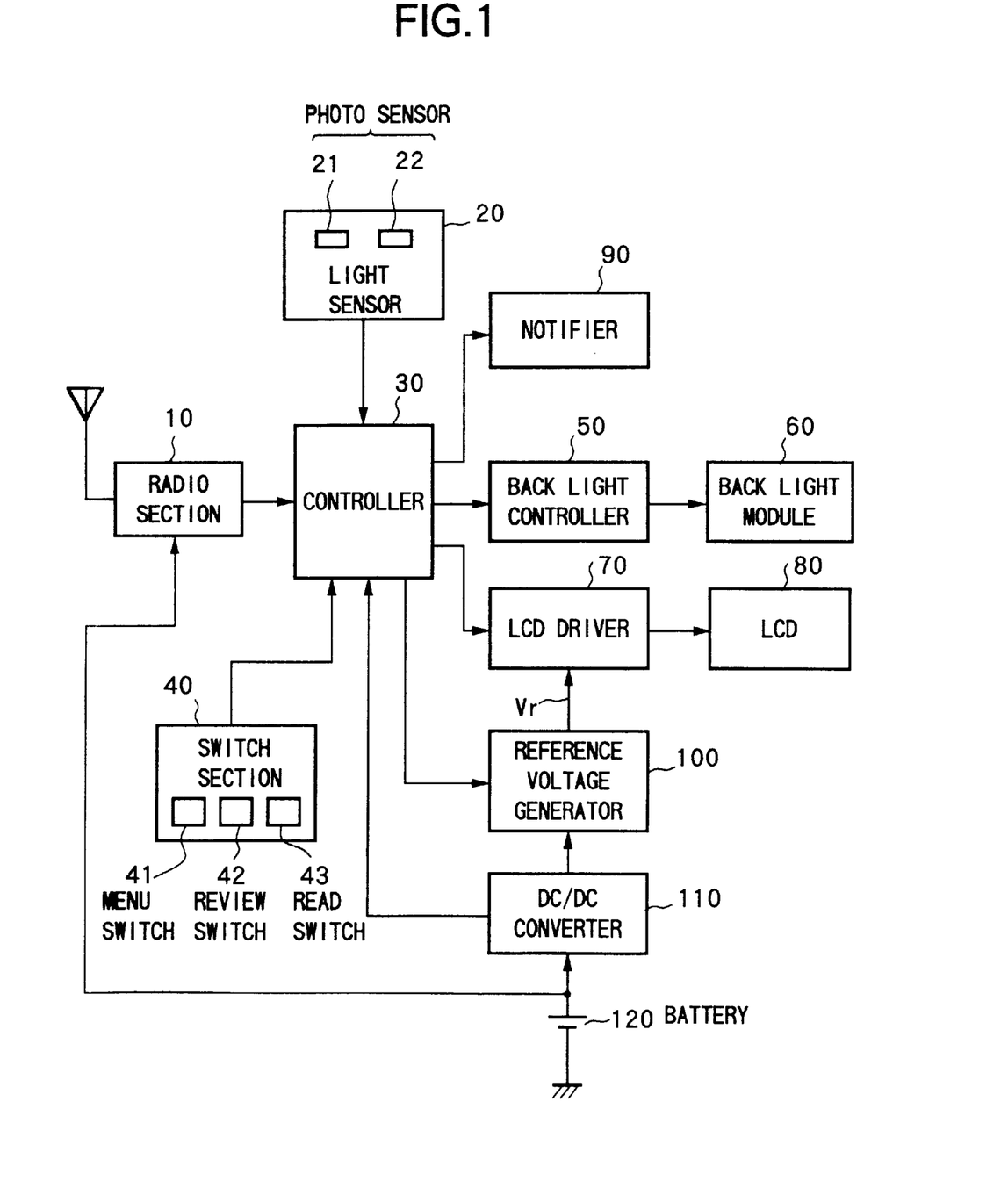
FIG. 1 is a block diagram to show the configuration of a pager according to an embodiment of the present invention.
Figure 2:
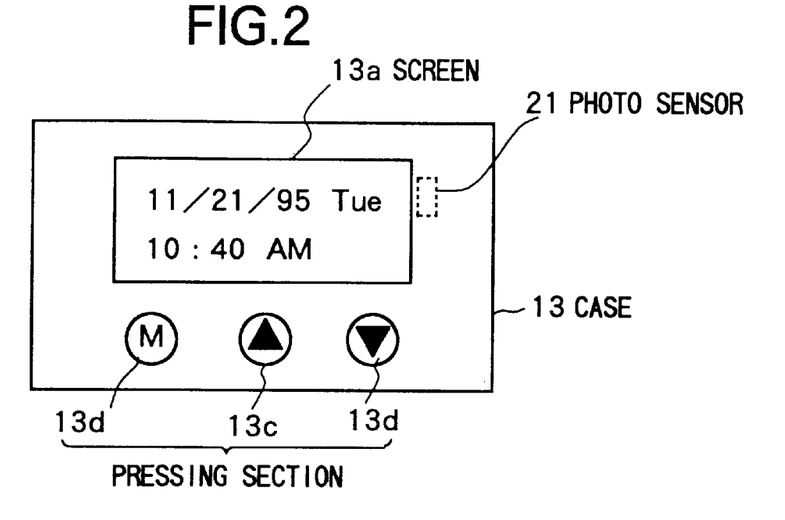
FIG. 2 is a plan view to illustrate the structure of the pager shown in FIG. 1.
Figure 3:
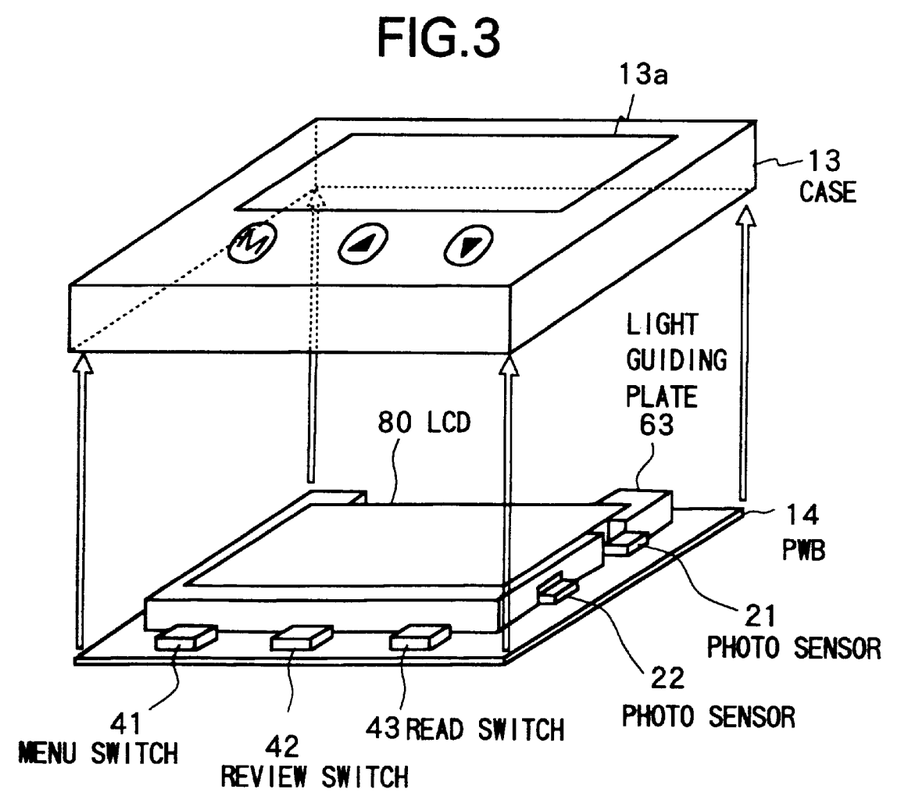
FIG. 3 is an exploded perspective view to illustrate the structure of the pager shown in FIG. 1.
Figure 4:
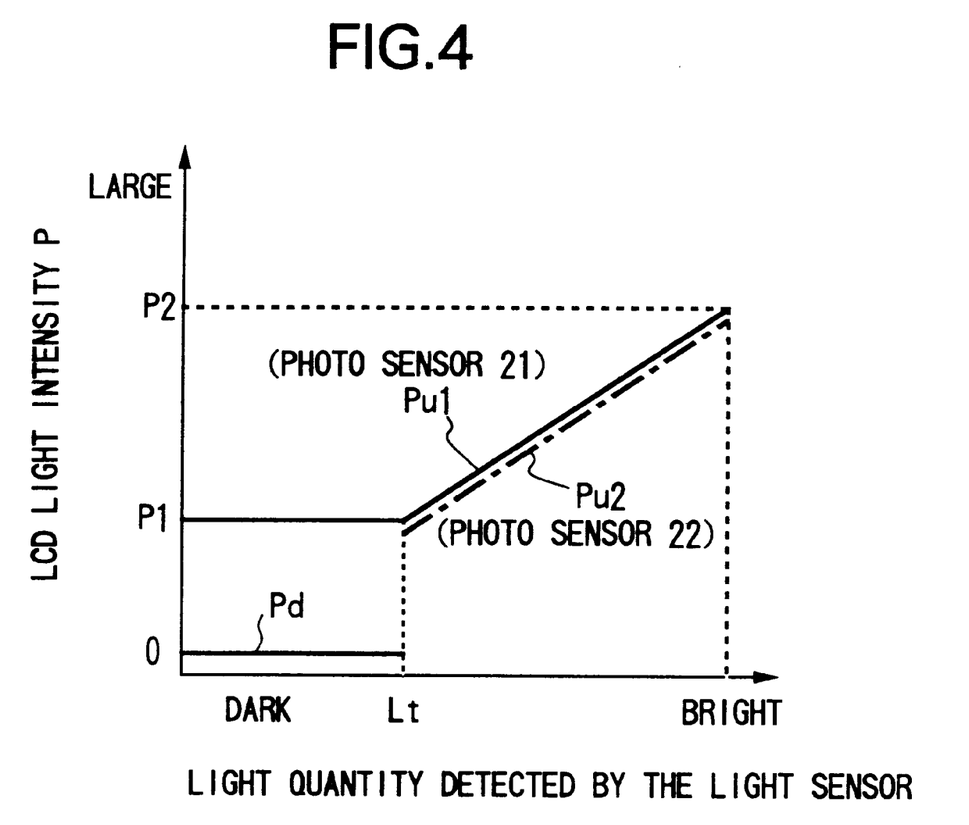
FIG. 4 is a diagram to show the relation between the light quantity detected by the light sensor and the light intensity of the LCD according to this embodiment.

FIG. 1 is a block diagram to show the configuration of a pager according to an embodiment of the present invention. FIG. 2 is a plan view and FIG. 3 is an exploded perspective view to show the structure of a pager of this embodiment. FIG. 4 shows the relation between the light quantity detected by a light sensor 20 and the light intensity of an LCD 80 in a pager of this embodiment.

As shown in FIG. 1, a pager of this embodiment comprises a radio section 10 which receives the individual pager signal from the radio base station of the individual pager system to which the pager subscribes, the light sensor 20 to recognize the ambient brightness, the LCD 80 to serve as a display section to display messages, an LCD driver 70, a back light module 60 to illuminate the LCD 80, a back light controller 50, a notifier 90 to inform the user of the receipt of the individual pager signal from the radio base station, a switch section 40 provided with switches to give various display instructions for the LCD 80, a controller 30 to control the operation of these sections above, a battery 120 to supply electricity to these sections above, a DC/DC converter 110, and a reference voltage generator 100. It is to be noted that FIG. 1 shows the characteristic configuration only, and other common elements are omitted.

The radio section 10 generates a base band signal according to the received individual pager signal and sends it to the controller 30.

The light sensor 20 is provided with photo sensors 21 and 22. The photo sensor 21 is implemented with a photo diode, for example. It receives the outdoor light received by a case 13 (See FIGS. 2 and 3) covering various circuits of the pager via a transparent screen 13a and detects the light quantity. The photo sensor 22 is implemented with a photo diode, for example, and receives the light from the back light module 60 as the light source and detects the light quantity. The light sensor 20 sends the light quantity data obtained by the photo sensors 21 and 22 to the controller 30. It is to be noted that the light quantity data sent from the light sensor 20 to the controller 30 are analog.

The controller 30 is made of a program-controlled CPU, for example. It controls the above sections according to the base band signal received from the radio section 10 and the light quantity data received from the light sensor 20. Upon receipt of the base band signal from the radio section 10, the controller 30 decodes the base band signal and, if the signal data contains the individual pager signal for itself, causes the notifier 90 to notify the user of the call. In addition, it extracts a received message contained in the base band signal and sends it to the LCD driver 70. In addition to the received message, the controller 30 sends various messages to be displayed on the LCD 80 to the LCD driver 70 according to the operation at the switch section 40. The controller 30 further sends, to the back light controller 50, the instructions required to control flickering of the back light module 60 according to the operation at the switch section 40.

As shown in FIG. 4, when the light quantity data supplied from the light sensor 20 is not less than the predetermined level "Lt", or when the light sensor 20 is receiving bright light "Pu", which is not less than the predetermined level, the contrast adjustment signal corresponding to the light quantity is generated and sent to the reference voltage generator 100. The contrast adjustment signal can be continuous values corresponding to the analog light quantity data. On the other hand, when the received light quantity detected by the light sensor 20 is below the predetermined level "Lt", the contrast adjustment signal to stop the output of the reference voltage "Vr" is sent to the reference voltage generator 100.

The switch section 40 provides instructions to the controller 30 to display various messages on the LCD 80 as the display section or to turn on the back light module 60. The switch section 40 is provided with switches to provide instructions to the controller 30. Switches provided here include, as shown in FIG. 1 for example, a menu switch 41 to display the time and the setting status of the pager on the LCD 80, a review switch 42 to display the received message on the LCD 80, and a read switch 43 to turn on the back light module 60.

Upon receipt of the contrast adjustment signal from the controller 30, the reference voltage generator 100 generates the reference voltage "Vr" and supplies it to the LCD driver 70. The reference voltage "Vr" continuously changes corresponding to the continuous values of the contrast adjustment signal.

The LCD driver 70 displays the received messages and display messages sent from the controller 30 on the LCD 80. It also generates the driving voltage according to the reference voltage "Vr" supplied from the reference voltage generator 100 and causes display on the LCD 80 with the brightness in proportion to the intensity of the reference voltage "Vr". As described above, the intensity of the reference voltage "Vr" is determined according to the contrast adjustment signal from the controller 30 and the values of the contrast adjustment signal are determined according to the light quantity data from the light sensor 20. As a result, the light intensity of the LCD 80 set by the LCD driver 70 is in proportion to the light quantity received by the light sensor 20. Thus, the contrast of the message displayed on the LCD 80 is automatically adjusted according to the light quantity Pu received by the light sensor 20. It is recommended to determine the relation between the received light quantity at the light sensor 20 and the light intensity of the LCD 80 through experiments so as to achieve the optimum contrast for the displayed message.

When the received light quantity detected by the light sensor 20 is below the predetermined light level "Lt" and the contrast adjustment signal to stop the output of the reference voltage "Vr" to the reference voltage generator 100, the light intensity P of the LCD 80 becomes 0 or an extremely weak intensity Pd. In other words, when it is dark around the pager, the light intensity of the LCD 80 is lowered to stop displaying messages so as to prevent wasteful consumption of electricity.

The back light module 60 comprises a light emitting diode (hereinafter referred to as "LED") as the light source and a light guiding plate 63 to guide the light emitted from the LED so as to illuminate the LCD 80. The LED can be turned on and off under the control by the back light controller 50.

Upon receipt of the light-on or light-off instruction for the back light module 60 from the controller 30 given by operation of the read switch 43, the back light controller 50 controls the back light module 60 according to the given instruction to turn on or off the LED. The controller 30 sends the light-on instruction for the back light module 60 to the back light controller 50 when it detects the operation to instruct turning on of the back light module 60 by the read switch 43 of the switch section 40 while the light quantity of the outdoor light detected by the photo sensor 21 is below Lt.

The notifier 90 is embodied with a speaker and a vibrator. Upon receipt of the individual pager signal by the radio section 10, the notifier 90 generates alarm sounds or vibrates the pager under the control by the controller 30 so as to notify the user of the receipt of the individual pager signal.

The battery 120 is a primary battery to supply electricity to the radio section 10. The voltage from the battery 120 is also converted by the DC/DC converter 110 so that it is supplied to the controller 30 and the reference voltage generator 100.

Figure 7:
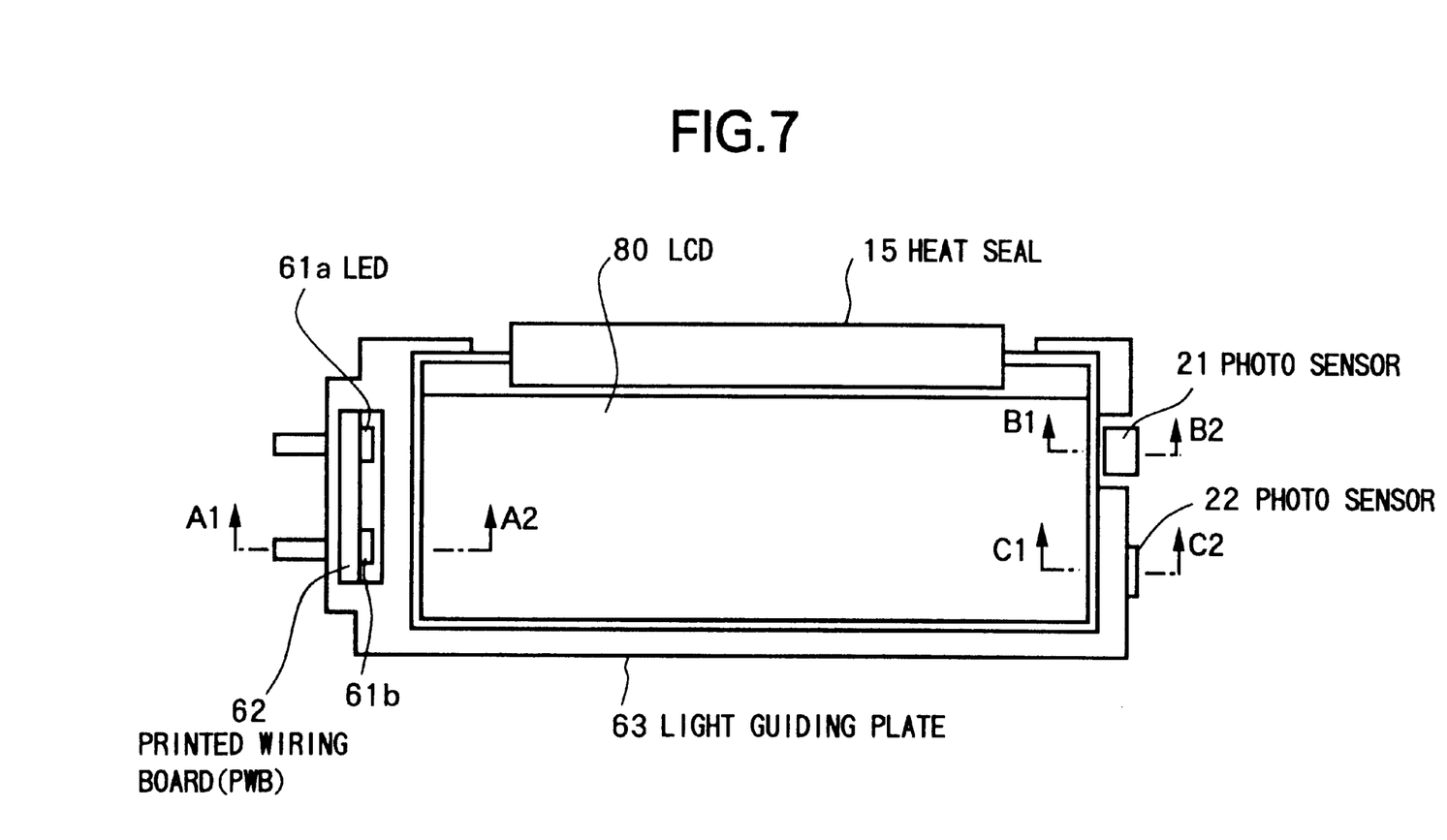
FIG. 7 is a plan view to show the structure of a back light module 60.
Figure 8:
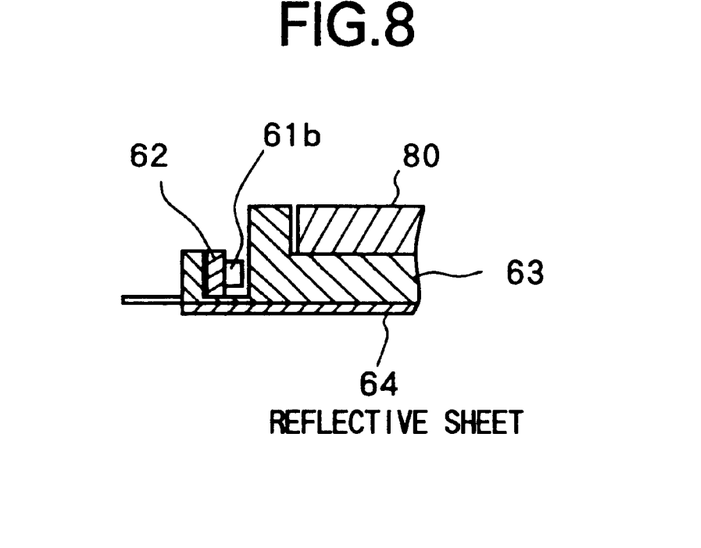
FIG. 8 is a sectional view along the line A—A in FIG. 7.
Figure 9:
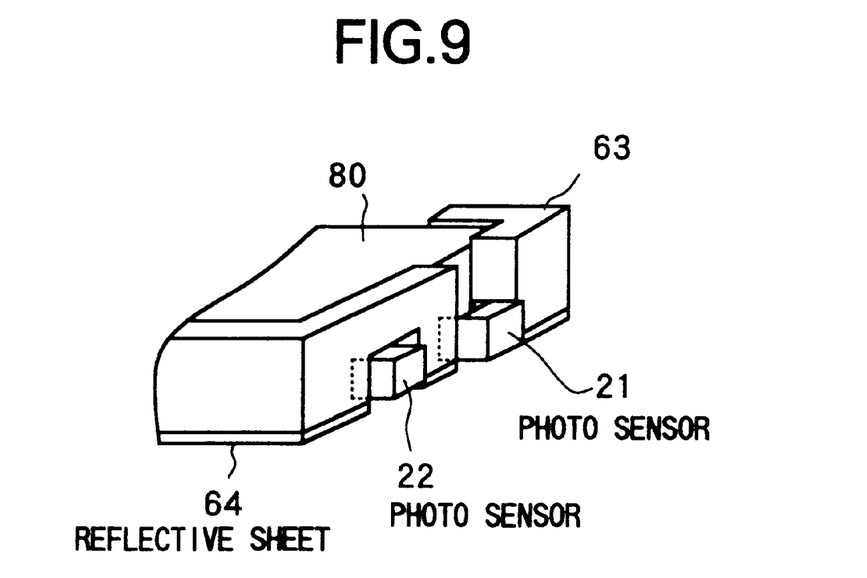
FIG. 9 is a partial enlarged view of the light sensor.
Figure 10:
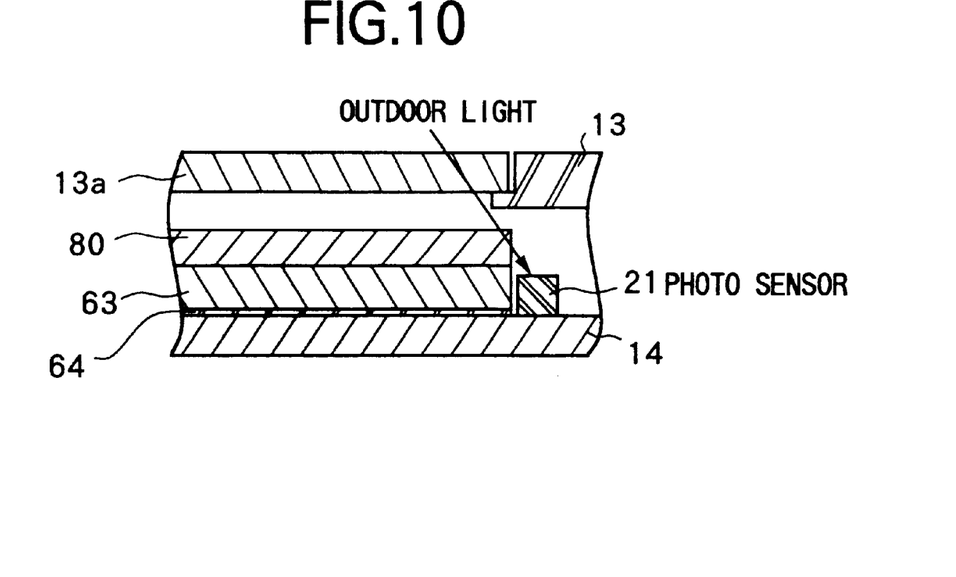
FIG. 10 is a sectional view along the line B—B in FIG. 7.
Figure 11:
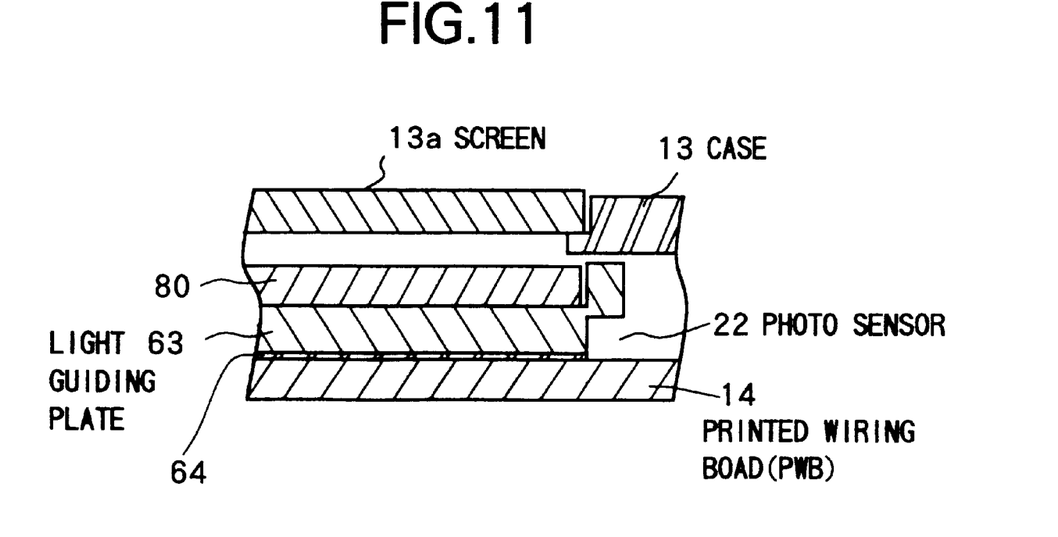
FIG. 11 is a sectional view along the line C—C in FIG. 7.

Referring now to FIGS. 2 and 3 as well as FIGS. 7 to 11, the structure of a pager according to this embodiment will be described below. FIG. 2 is a plan view and FIG. 3 is an exploded perspective view of this embodiment. FIG. 7 is a plan view to show the structure of the back light module 60, FIG. 8 is a sectional view along the line A—A of FIG. 7, FIG. 9 is a partial enlarged view to show the light sensor 20, FIG. 10 is a sectional view along the line B—B of FIG. 7, and FIG. 11 is a sectional view along the line C—C of FIG. 7.

As shown in FIG. 3, the components of the pager according to this embodiment as described above are mounted on a printed wiring board (PWB) 14 and covered with the case 13. The case 13 is provided on its top, as shown in FIG. 2, with the transparent screen 13a serving as a view window to see the LCD 80 for message display and pressing sections 13b, 13c and 13d which respectively correspond to the menu switch 41, the review switch 42 and the read switch 43 of the switch section 40. The screen 13a is formed with transparent resin and positioned so as to cover the LCD 80 mounted on the PWB 14. The pressing sections 13b, 13c and 13d are formed with flexible resin or rubber and positioned immediately above the menu switch 41, the review switch 42 and the read switch 43 respectively so that these switches can be operated by pressing of the pressing sections 13b, 13c and 13d.

The PWB 14 accommodates the above components, which are electrically connected on it. The LCD 80 is, as shown in FIG. 7, electrically connected to the PWB 14 via a heat seal 15.

Among the components mounted on the PWB 14, the back light module 60 comprises, as shown in FIGS. 3 and 7, light emitting diodes (LEDs) 61a and 61b to illuminate the LCD 80 from a side, a PWB 62 to position the LEDs 61a and 61b and electrically connect them to the PWB 14, the light guiding plate 63 surrounding the LCD 80 which guides the light emitted by the LEDs 61a and 61b to illuminate the LCD 80, and a reflective sheet 64 to effectively illuminate the LCD 80.

The LEDs 61a and 61b are opposed to one side of the LCD 80 so that they illuminate the LCD 80 in parallel with the light guiding plate 63 placed between them. The light guiding plate 63 covers the circumference and the bottom (or the PWB side) of the LCD 80 as shown in FIG. 7 and its sectional view FIG. 8. Thus, the lights emitted by the LEDs 61a and 61b are guided by the light guiding plate 63 and irradiated to the LCD 80 from the circumference and the bottom of the LCD 80. The reflective sheet 64 is inserted between the light guiding plate 63 and the PWB 14 to reflect the light on the bottom of the LCD 80 to irradiate the LCD 80 for a better irradiation efficiency.

The photo sensors 21 and 22 of the light sensor 20 are, as shown in FIG. 7, positioned on the other side of the LCD 80 opposite to the side with the LEDs 61a and 61b. As shown in FIG. 9, the photo sensors 21 and 22 are surrounded with the light guiding plate 63, which is cut off above the photo sensor 21. Thus, as shown in FIG. 10, the photo sensor 21 receives the outdoor light around the pager via the screen 13a of the case 13 and the LCD 80 only so that it can detect the light quantity of the outdoor light. On the other hand, the photo sensor 22 is, as shown in FIG. 11, entirely covered with a light guiding plate 63 and never receives the outdoor light. It just receives the lights emitted by the LEDs 61a and 61b via the light guiding plate 63 and detects the light quantity of the back light.

It is to be noted that the above structure of this embodiment described referring to the attached drawings is just an example and it does not prevent other structures which are generally adopted by pagers. It is essential for the present invention, however, to have a structure which enables the photo sensor 21 of the light sensor 20 to detect the received light quantity of the outdoor light and enables the photo sensor 22 to detect the back light quantity.

Figure 5:
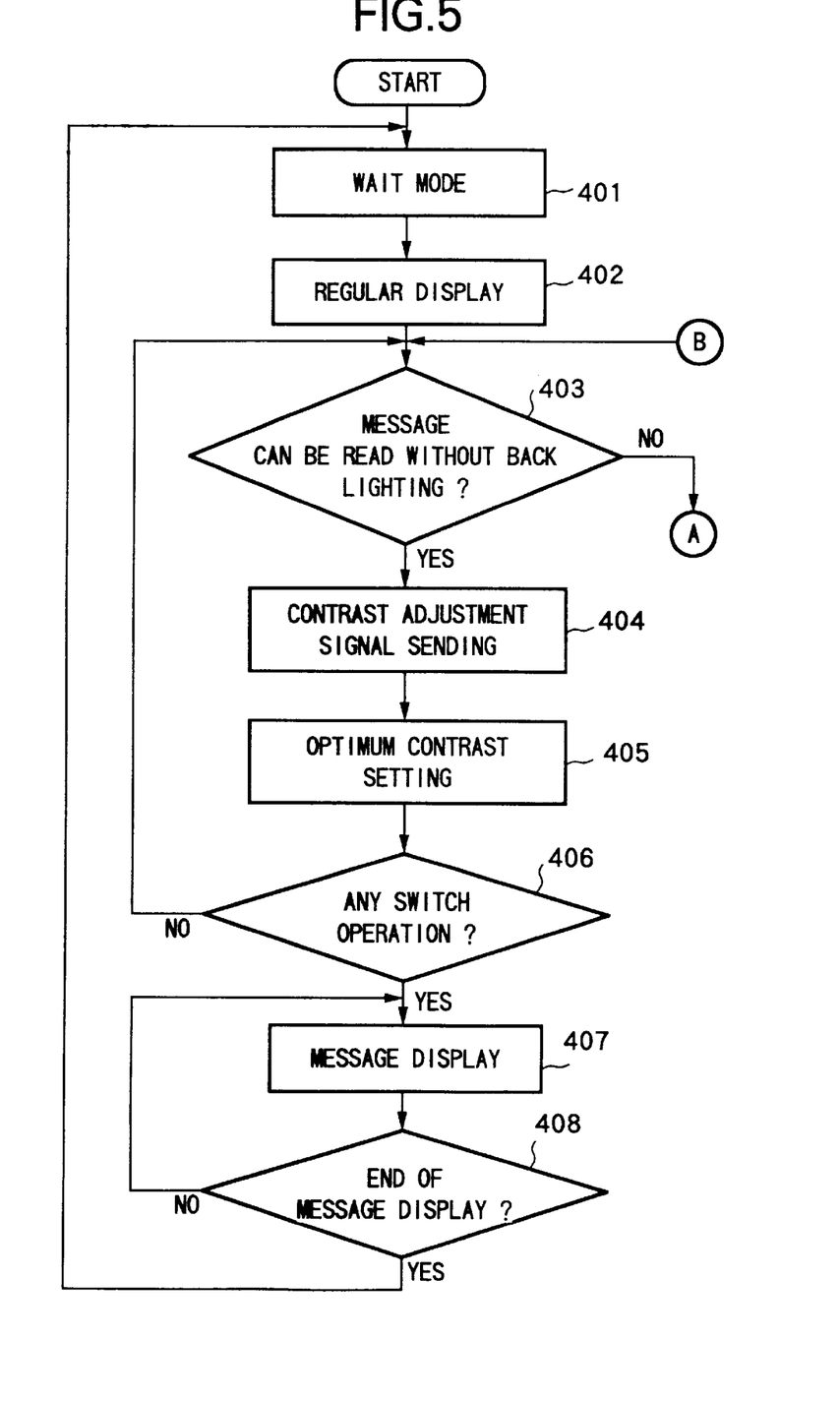
FIG. 5 is a flowchart to show an operation according to this embodiment illustrating the operation when the light quantity detected by the light sensor is at or above a predetermined level.
Figure 6:
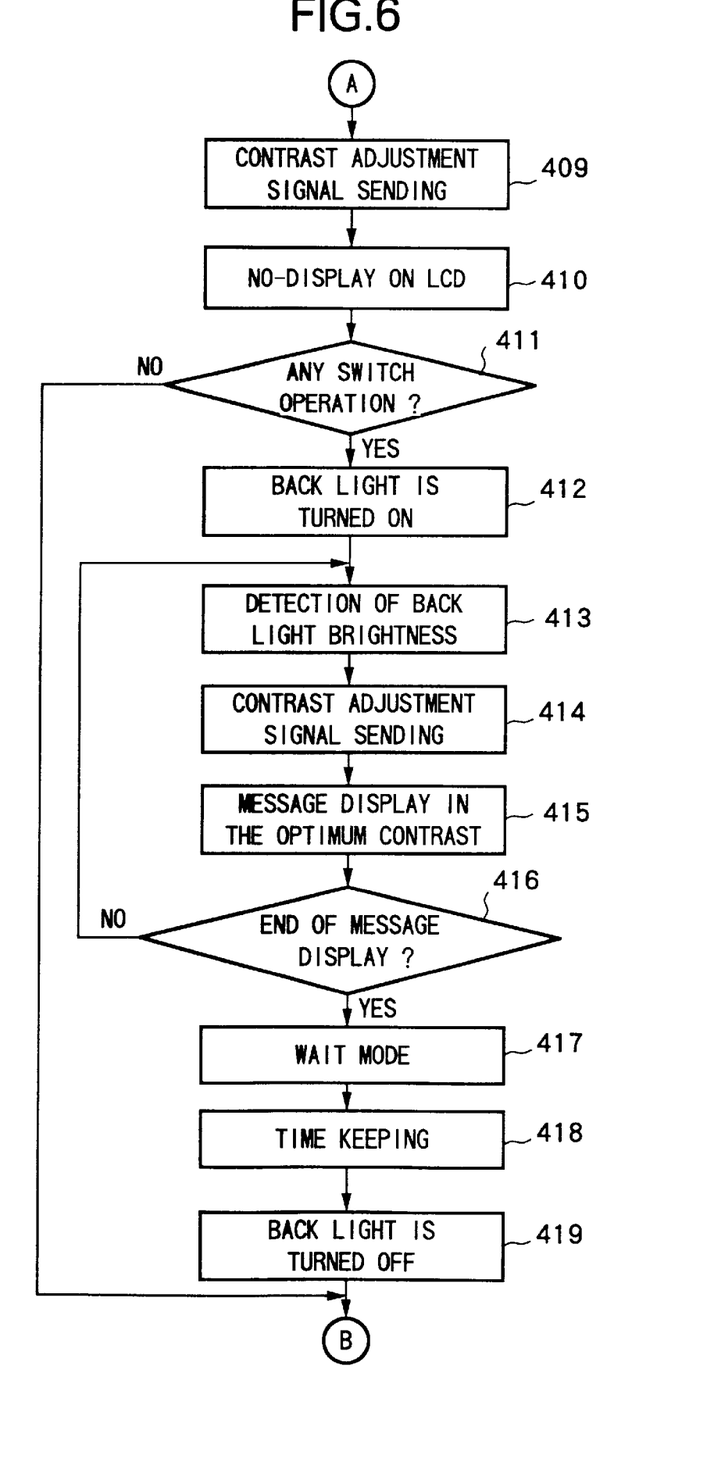
FIG. 6 is a flowchart to illustrate an operation of this embodiment illustrating the operating when the light quantity detected by the light sensor is below a predetermined level.

Next, referring to the flowcharts of FIGS. 5 and 6, the contrast adjustment operation for the LCD 80 according to this embodiment will be described.

When the pager of this embodiment enters the wait mode (Step 401), the controller 30 controls the LCD driver 70 and the reference voltage generator 100 for regular display, where general data such as time indication are displayed as the display message on the LCD 80 with the predetermined illuminance (Step 402). Regular display is provided for t seconds (4 seconds, for example) using the timer incorporated in the controller 30.

The pager always detects the received light quantity from the outdoor light with the light sensor 20. After t seconds have passed since the start of regular display, the controller 30 judges whether the photo sensor 21 is detecting the light quantity of Lt or more, i.e. whether the display message on the LCD 80 can be read without turning on the back light module 60 (Step 403).

When the pager is in a bright place and the photo sensor 21 detects the light quantity of Lt or more (Yes in Step 403), the controller 30 sends the contrast adjustment signal corresponding to the received light quantity to the reference voltage generator 100 (Step 404). Thus, the LCD driver 70 outputs the driving voltage corresponding to the reference voltage "Vr" output from the reference voltage generator 100 and the LCD 80 is set so that the message is displayed in the optimum contrast (Step 405).

After that, when the switch section 40 is operated for message display (Yes in Step 406), the controller 30 controls the LCD driver 70 without changing the contrast adjustment signal to the reference voltage generator 100 to have the LCD 80 display the message (Step 407). Upon completion of the message display, the pager returns to the wait mode (Steps 408, 401). After setting the contrast of the LCD 80 at Step 405, if the switch section 40 is not operated for message display (No in Step 406), the pager returns to Step 403 to repeat the contrast adjustment in order to cope with any change in the ambient optical environment.

In Step 403, when the light quantity received from the photo sensor 21 is lower than Lt, i.e., the display message on the LCD 80 cannot be read without turning on the back light module 60 (No in Step 403), the controller 30 sends the contrast adjustment signal to stop the output of the reference voltage "Vr" to the reference voltage generator 100 (Step 409). As a result, the reference voltage "Vr" supplied to the LCD driver 70 is cut off and the LCD 80 enters the no-display mode (Step 410).

When the switch section 40 is operated and an instruction to display a message on the LCD 80 is entered under such circumstances (Yes in Step 411), the controller 30 controls the back light controller 50 to turn on the back light module 60 (Step 412). When the back light module 60 is turned on, the photo sensor 22 detects the light quantity of the back light to be irradiated from the back light module 60 to the LCD 80 (Step 413). The controller 30 sends the contrast adjustment signal corresponding to the detected light quantity to the reference voltage generator 100 (Step 414). Thus, the LCD driver 70 outputs the driving voltage corresponding to the reference voltage "Vr" output from the reference voltage generator 100 and the LCD 80 is set so that the message is displayed in the optimum contrast with the back light module 60 turned on (Step 415).

Upon completion of the display message check (Yes in Step 416), the pager goes to the wait mode (Step 417). The controller 30 turns off the back light module 60 t seconds later (Steps 418 and 419) and, according to the received light quantity detected by the photo sensor 21, judges whether the display message on the LCD 80 can be read without back lighting (Step 403). When the message cannot be read without turning on the back light module 60, the LCD 80 enters the no-display mode as described above, and electricity supply to the LCD driver 70 is reduced (Steps 409 and 410).

As described above, the pager of the present invention detects the received light quantity at the LCD and adjusts the light intensity of the LCD according to the detected received light level at the LCD. It can be set so that the message is displayed in the optimum contrast corresponding to the received light quantity of the LCD.

When the back light is not turned on, the light intensity of the LCD can be adjusted according to the light quantity of the outdoor light and, when the back light is turned on, the light intensity of the LCD is adjusted according to the light quantity of the back light. Thus, the pager can be set so that the message can be always displayed in the optimum contrast no matter whether the back light is turned on or off.

Further, when it is dark around the pager and the user cannot see the display message on the LCD without back lighting, the LCD is switched to the no-display mode so that the pager can prevent meaninglessly quick consumption of the battery caused by excessive light intensity of the LCD.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A pager having a notifier means to notify the receipt of a call signal, a display means for displaying a received message received together with said call signal, and an illumination means for illuminating said display means, the pager comprising:

a first light detection means for detecting an ambient light quantity at the surface of said display means;

a second light detection means for detecting an illuminating light quantity at said display means when said illumination means illuminates said display means;

a control means for generating a contrast adjustment signal corresponding to the detected ambient light quantity at said display means when said illuminating means is off and corresponding to both the detected ambient and illuminating light quantities at said display means when said illuminating means illuminates said display means;

a reference voltage generation means for generating a reference voltage corresponding to the contrast adjustment signal generated by said control means; and a contrast adjustment means for adjusting the light intensity of the display message on said display means according to the reference voltage supplied from said reference voltage generation means.

2. The pager as set forth in claim 1, wherein said first and second light detection means detects the ambient and illuminating light quantities, respectively, at said display means as analog light quantity data, said contrast adjustment signal generated by said control means can be continuous values corresponding to the light quantity data detected by said first or second light detection means, said reference voltage generation means continuously changes said reference voltage according to said contrast adjustment signal, and said contrast adjustment means continuously adjusts the light intensity of the display message according to changes in said reference voltage.

3. The pager as set forth in claim 1, wherein said control means generates said contrast adjustment signal when either of the detected ambient or illuminating light quantities at said display means is found to be equal to or more than a predetermined threshold as a result of detection by said first and second light detection means, respectively, and generates said contrast adjustment signal to provide instruction to stop the output of said reference voltage to said reference voltage generation means when the detected ambient light quantity at said display means is found to be below the predetermined threshold as a result of detection by said first light detection means.

4. The pager as set forth in claim 1, wherein said first and second light detection means detects the ambient and illuminating light quantities at said display means as analog light quantity data, said control means generates said contrast adjustment signal when either of the detected ambient or illuminating light quantities at said display means is found to be equal to or more than a predetermined threshold as a result of detection by said first and second light detection means, respectively, and generates said contrast adjustment signal to provide instruction to stop the output of said reference voltage to said reference voltage generation means when the detected ambient light quantity at said display means is found to be below the predetermined threshold as a result of detection by said first light detection means and said contrast adjustment signal generated by said control means can be continuous values corresponding to the light quantity data detected by said first light detection means, said reference voltage generation means continuously changes said reference voltage according to said contrast adjustment signal, and said contrast adjustment means continuously adjusts the light intensity of the display message according to changes in said reference voltage.

5. The pager as set forth in claim 1, wherein said control means generates said contrast adjustment signal corresponding to the detection result of said first light detection means when said display means is not illuminated by said illumination means and generates said contrast adjustment signal corresponding to the detection result of said second light detection means when said display means is illuminated by said illumination means and generates said contrast adjustment signal to provide instruction to stop the output of said reference voltage to said reference voltage generation means when the detected ambient light quantity at said display means is found to be below a predetermined threshold as a result of detection by said first light detection means while said display means is not illuminated by said illumination means.

6. The pager as set forth in claim 1, wherein said control means generates said contrast adjustment signal corresponding to the detection result of said first light detection means when said display means is not illuminated by said illumination means and generates said contrast adjustment signal corresponding to the detection result of said second light detection means when said display means is illuminated by said illumination means and displays said display message on said display means and provides illumination instruction to said illumination means if, when it receives the instruction to display said display message on said display means, said display means is not illuminated by said illumination means and the detected ambient light quantity of said display means is found to be below a predetermined threshold as a result of detection by said first light detection means.

7. The pager as set forth in claim 1, wherein said control means generates said contrast adjustment signal corresponding to the detection result of said first light detection means when said display means is not illuminated by said illumination means and generates said contrast adjustment signal corresponding to the detection result of said second light detection means when said display means is illuminated by said illumination means, generates said contrast adjustment signal to provide instruction to stop the output of said reference voltage to said reference voltage generation means when the detected ambient light quantity at said display means is found to be below a predetermined threshold as a result of detection by said first light detection means while said display means is not illuminated by said illumination means, and displays said display message on said display means and provides illumination instruction to said illumination means if, when it receives the instruction to display said display message on said display means, said display means is not illuminated by said illumination means and the detected ambient light quantity of said display means is found to be below the predetermined threshold as a result of detection by said first light detection means.

* * * * *